A. FRICKER.
DISCHARGE MECHANISM FOR BITUMINOUS DISTRIBUTERS.
APPLICATION FILED JUNE 6, 1917.
1,297,135.
Patented Mar. 11, 1919.
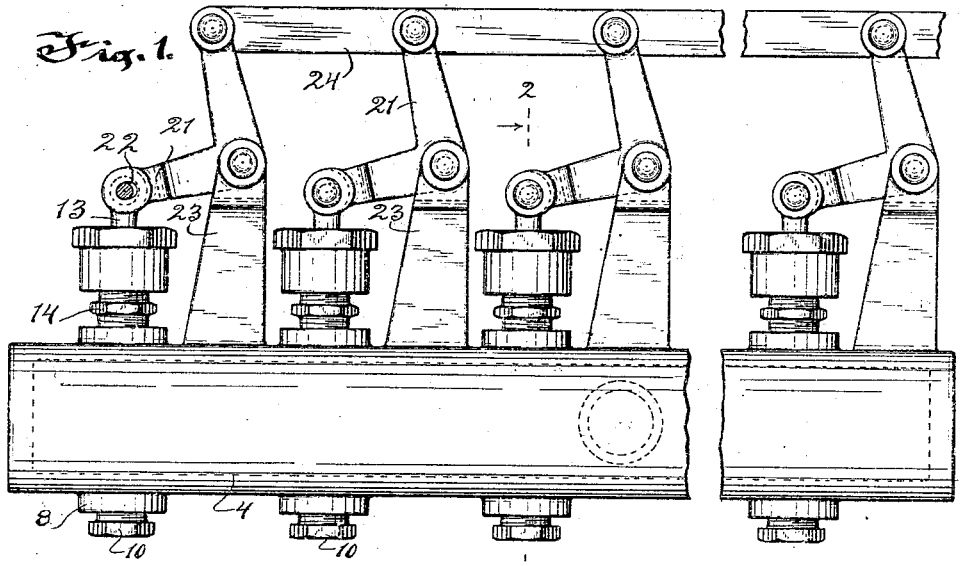
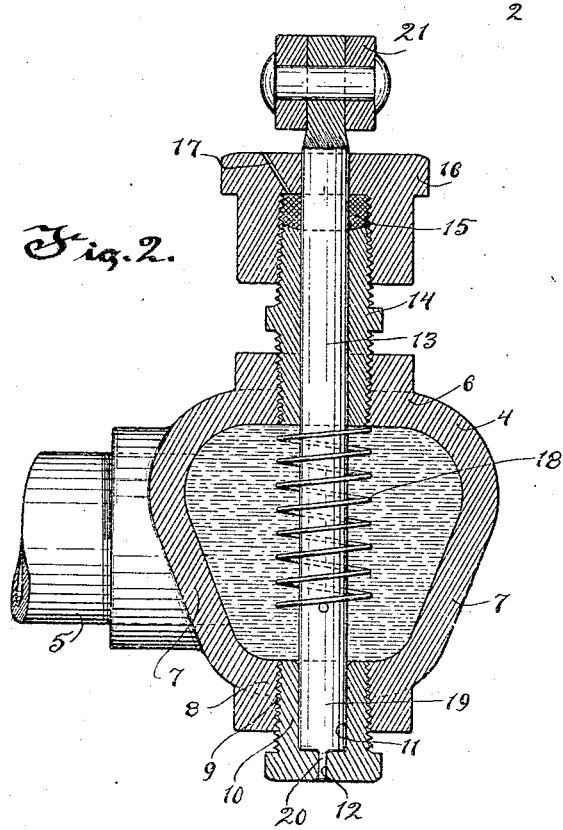
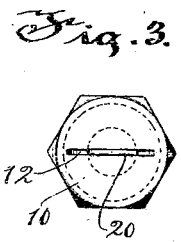
INVENTOR
Anthony Fricker
Worrell, Keeney & French
ATTORNEYS

UNITED STATES PATENT OFFICE.

ANTHONY FRICKER, OF CLEVELAND, OHIO.

DISCHARGE MECHANISM FOR BITUMINOUS DISTRIBUTERS.

1,297,135.  Specification of Letters Patent.  Patented Mar. 11, 1919.

Application filed June 6, 1917. Serial No. 173,255.

*To all whom it may concern:*

Be it known that I, ANTHONY FRICKER, a citizen of the United States, and resident of Cleveland, in the county of Cuyahoga and State of Ohio, have invented new and useful Improvements in Discharge Mechanism for Bituminous Distributers, of which the following is a description, reference being had to the accompanying drawings, which are a part of this specification.

The invention relates to discharge mechanism for distributers of bituminous material and petroleum products for road making.

The materials distributed by the machine have a natural tendency to solidify and congeal under ordinary temperatures so that for successful operation it is necessary to keep the discharge valves and orifices heated to prevent clogging to obviate the necessity of first heating the valves by means of a blow torch to loosen up the congealed material. To provide for this I have devised a discharge mechanism in which the discharge orifices are formed in the manifold and controlled by valve rods disposed within the manifold and adapted to seat in the orifices whereby any tendency of the material to clog the orifices is prevented.

The invention is further designed to provide a manifold of such a shape as to permit the ready discharge of material therefrom through the nozzles and to the self-draining.

The invention further consists in the several features hereinafter set forth.

In the drawings:

Figure 1 is a view of the device embodying the invention, parts being broken away and parts being shown in section;

Fig. 2 is a section taken on the line 2—2 of Fig. 1;

Fig. 3 is a bottom view of one of the nozzles.

In general the discharge mechanism comprises a manifold 4, which is connected by a supply pipe 5 to the distributer (not shown), a plurality of nozzles, and means for controlling the operation of and cleaning said nozzles.

The manifold 4 consists of a closed pipe having a broad top portion 6, and sides 7 tapering inwardly to the bottom portion 8 whereby the material will naturally tend to flow toward the bottom of the manifold. In practice this manifold is supplied with the bituminous material in a hot condition and the material is discharged therefrom while in this condition.

The bottom portion 8 of the manifold is provided with a plurality of threaded openings 9 each provided with threaded plugs 10. These plugs 10 form the discharge nozzles and have a bore 11 therein and a transverse discharge orifice 12 communicating with the bore. The plugs are connected to the manifold so as to practically form a part thereof so that the nozzle being at the bottom of the manifold will be heated when the manifold is heated by the hot material to be spread and thus any tendency of the material to clog the nozzle will be prevented.

The means for controlling the operation of and cleaning the nozzles in each instance comprises a valve rod 13 disposed within the manifold and vertically slidably mounted in a bearing member 14 mounted in the top portion 6 of the manifold, said bearing being lubricated by a stuffing box consisting of the packing 15 and the box nut 16 secured to the member 14, an aperture 17 being provided in the nut to introduce therein a solvent oil for the material that is being used to permit the valve rod to move freely. Each valve rod 13 is normally held to its seat by a spring 18 bearing against the inside top portion of the manifold at one end and secured at its other end to said rod. The end 19 of the rod fits within the bore 11 and an extension 20 on said end fits within the orifice 12 to shut off the nozzle. Any suitable means may be used for raising the valve rods and I have shown in each instance a bell crank lever 21 having its slotted end 22 connected with the upper end of the valve rod, said lever being pivotally mounted on any suitable support such as a lug 23 carried by the manifold and said lever being moved to open the valve by a longitudinally movable rod 24 which is shown as connected to all of the levers to simultaneously open the nozzles.

In this construction, the hot bituminous material or heavy petroleum is introduced into the manifold and the rod 24 shifted to move the levers 21 to raise the rods 13 so that the material, which is generally delivered under pressure, passes through the bores 11 and orifices 12 onto the road. The release of the rod 24 permits the valves to be automatically closed through the agency of the springs 18. On stopping the operation of the machine for any length of time the supply of material to the manifold is stopped and that left in the manifold passes out through the nozzle, the shape of the manifold assisting in draining it and then the rod 24 is released permitting the springs 18 to move the valve rods 13 to close the nozzles, the end 19 and extension 20 moving into the bore 11 and orifice 12 respectively and pushing any material which would tend to clog the discharge openings outwardly so that when it is again desired to start the machine everything will be ready.

The invention thus exemplifies a discharge mechanism for a distributer of the kind mentioned in which the heated material is discharged direct from the manifold, in which the discharge of material is easily controlled by valves of simple construction and in which the valve is self-cleaning whereby the necessity for heating the valves to remove congealed material is obviated.

I am aware that the details of construction herein described are subject to some modification and change and I desire it to be understood that such changes in construction as come within the scope of the appended claims I deem to be within the spirit of my invention.

What I claim as my invention is:

1. In a bituminous distributer, the combination of a manifold adapted to retain material therein under pressure and provided with a plurality of nozzles for discharging the material directly onto the road, of a reciprocating valve for each nozzle and movable in line therewith for controlling the passage of material therethrough, said valve being movable to a position within said nozzle to shut off the passage of material from the manifold, means for positively guiding each valve in its movement with respect to the nozzle which it controls, and means for operating said valves.

2. In a bituminous distributer, the combination of a manifold adapted to retain material therein under pressure and provided with a plurality of nozzles for unobstructed discharge of the material onto the road and having guide openings in its upper portion in line with the nozzles, valve members reciprocating in said guide openings and positively guided thereby to bring their lower ends to a position within the nozzles to shut off the passage of material from the manifold, and means exterior of the manifold for reciprocating said valve members.

3. In a bituminous distributer, the combination of a manifold adapted to retain material therein under pressure and provided with discharge nozzles, each including a bore communicating directly with the bottom of the manifold and a discharge orifice at the outer end of the bore, said manifold having guide openings in its upper portion in line with said bores, valve rods extending from without the manifold through said guide openings and reciprocable therein to bring their lower ends to a position within said bores to shut off the passage of material from the manifold, and means connected to those portions of the rods without the manifold for operating said valve rods.

In testimony whereof I affix my signature

ANTHONY FRICKER.